(12) United States Patent
Kamsvåg

(10) Patent No.: US 7,658,159 B2
(45) Date of Patent: Feb. 9, 2010

(54) FORESHIP ARRANGEMENT FOR A VESSEL OF THE DISPLACEMENT TYPE

(75) Inventor: Øyvind Gjerde Kamsvåg, Flø (NO)

(73) Assignee: Ulsteinvik Design AS, Ulsteinvik (NO)

( * ) Notice: Subject to any disclaimer, the term of this patent is extended or adjusted under 35 U.S.C. 154(b) by 0 days.

(21) Appl. No.: 11/816,871

(22) PCT Filed: Feb. 23, 2006

(86) PCT No.: PCT/NO2006/000073

§ 371 (c)(1),
(2), (4) Date: Aug. 22, 2007

(87) PCT Pub. No.: WO2006/096066

PCT Pub. Date: Sep. 14, 2006

(65) Prior Publication Data

US 2008/0149014 A1    Jun. 26, 2008

(30) Foreign Application Priority Data

Mar. 9, 2005    (NO) .................................. 20051221

(51) Int. Cl.
*B63B 1/00* (2006.01)
(52) U.S. Cl. ................................................... 114/61.27
(58) Field of Classification Search ............. 114/61.28, 114/61.2, 40, 417; D12/300
See application file for complete search history.

(56) References Cited

U.S. PATENT DOCUMENTS

| 3,443,544 | A |   | 5/1969  | Begizov        |          |
|-----------|---|---|---------|----------------|----------|
| 3,511,203 | A | * | 5/1970  | Buyscoll       | 114/61.28 |
| 3,521,590 | A | * | 7/1970  | German et al.  | 114/41   |
| RE26,997  | E |   | 12/1970 | Eckert         |          |
| 3,653,352 | A |   | 4/1972  | Tomiyama et al.|          |
| 2003/0089290 | A1 |   | 5/2003 | Van Diepen    |          |

FOREIGN PATENT DOCUMENTS

| DE | 19608415 A1 | 9/1997 |
| GB | 1215530 A | 12/1970 |

* cited by examiner

Primary Examiner—Ed Swinehart
(74) Attorney, Agent, or Firm—Rodman & Rodman

(57) ABSTRACT

A foreship arrangement for a vessel of the displacement type. The foreship consists of the part of the ship in front of the vessel's midship mark and the vessel has a transversely symmetrical hull form about its center line and a substantially conventional bow form below its design water line, characterized in that the stem line of the vessel turns substantially backwards in relation to the length direction of the ship from a transition point at or immediately above the design water line.

27 Claims, 4 Drawing Sheets

FORESHIP ARRANGEMENT FOR A VESSEL OF THE DISPLACEMENT TYPE

BACKGROUND OF THE INVENTION

The present invention relates to a new design of the foreship of a vessel of the displacement type. More specifically, the invention relates to an arrangement as disclosed in the preamble of independent claim 1.

Ever since the start of oil activities in the North Sea, all vessels engaged in marine operations have been characterised by having their wheelhouse and superstructure with equipment located immediately behind the forecastle deck and extending right up to the collision bulkhead. A large loading deck or working deck has been located aft of the superstructure and wheelhouse. This arrangement is a legacy of the first platform supply vessels which were used on the British continental shelf in the 1950s and is still the dominant solution today.

When these vessels are not in operation or are waiting on the weather (backing), they will normally have their bow turned upwind and into the waves.

The bow design has been a raked bow or straight stem line up to the design water line and above that a raked bow, or a solution including a bulb and a raked bow where the bulb can be defined as a bulge in the hull, primarily below the water line, to improve the wave system and resistance.

Typical negative effects of the aforementioned conventional bow forms are that they reflect incoming waves to too great a degree (wave formation gives energy loss), they are heavily subjected to the slamming of waves against the ship side, they generate a great deal of spray and they are subjected to the occurrence of green water on the deck in front of the superstructure.

When this type of bow shape meets incoming waves, the submerged volume (later referred to as "facing volume") increases very quickly, buoyancy increases as quickly and the retardation force becomes very large. These effects intensify with increasing wave height and increasing speed of the vessel into the wave direction.

Vessels with their superstructure and wheelhouse located on the weather deck immediately aft of the collision bulkhead and having a hull shape as described above are highly vulnerable to heavy weather damage.

The maximum speed at sea for these vessels is determined primarily by the water line length, entry angles of the foreship and the proportion of outwardly sloping frame lines in the bow, and by available thrust forces from the propeller(s). Typical maximum speed in calm water is about 13-16 knots, and they will normally have a loss of speed of about 3 to 5 knots in head sea. The speed loss in head sea is a direct result of the energy loss due to reflected waves, which results in retardation of the vessel.

Both during headway, in particular in head sea, and during backing/waiting, the crew, who have their quarters forward, will experience large accelerations and retardations. Such motions reduce the quality of their rest periods and have an adverse effect on their capacity to work. Reduced resting time and difficult working conditions increase the risk of accidents and injuries.

To reduce or eliminate the aforementioned drawbacks of the prior art, there is provided, according to the present invention, an arrangement as disclosed in the characterising clause of claim 1.

Advantageous embodiments of the invention are set forth in the dependent claims.

SUMMARY OF THE INVENTION

The design of the foreship according to the invention is intended for displacement hulls in the speed range of up to about 24 knots and with the forward bulkhead of the superstructure preferably arranged forward of amidships. The new bow shape is primarily intended to be used in vessels that are engaged in marine operations, such as construction vessels, pipelaying vessels, platform supply vessels, anchor handling vessels, diving ships, etc.

The foreship is designed transversely symmetrical about the centre line (CL) of the vessel. The frame lines of the hull increase in width from the base line (BL). The bottom is flat or has a deadrise and merges into the bilge at a given bilge radius. From the bilge up to a given height, the frame lines are slightly outwardly sloping. At the level of the forecastle deck, the outwardly sloping line form is terminated and is run on upwards as a curved line form back towards the centre line.

According to the invention, a new form of foreship has been developed which reduces or eliminates the negative effects that the commonly known bow shapes have. The foreship is designed to have slender water lines so that the submersion of the facing volume takes place over a considerable period of time, which means that the vessel cuts into the wave and the wave laps over the bow form and out to the side. Thus, the buoyancy force is distributed over time and the retardation forces are substantially reduced. This solution reduces reflection of waves, it eliminates the slamming of waves against the vessel's sides and bottom, the speed loss in head sea is reduced by about one knot as compared with the standard bow shapes, and the stem line has a profile which is designed to prevent the waves from reaching too high up. Pitch and heave motions will be reduced due to improved distribution of internal volume and more slender entry lines of the foreship.

The hull in the example is run/extended up to the weather deck. At the weather deck, the stem line is advantageously bent forwards to form a barrier in the form of a spray board to prevent sea spray from reaching this deck. This means that an enclosed volume is formed that extends up to the weather deck. Waves are thus allowed to creep up to the weather deck in the case of the largest waves.

The new design of the foreship will result in the following positive effects:

Lower accelerations and retardations, which give higher average speed at sea, thereby reducing power requirement and consumption of fuel.

A reduction in the amount of or the elimination of green water on deck.

Model tests carried out by Marintek/SINTEF in February 2005 verify the positive effects of the new design of the foreship.

Apart from the advantages mentioned above, the new foreship design will result in:

A lower probability of heavy weather damage to the foreship because the reflection of waves is reduced.

The elimination of the possibility of heavy weather damage to the front bulkhead in the superstructure.

Improved working environment on board with regard to accelerations and retardations, thereby improving safety during navigation and providing higher operability, especially in head sea.

reduction of noise and vibrations because of gentle motions and reduced slamming of the waves against the hull, thereby increasing comfort and improving safety with a view to efficient utilisation of the crew's resting and working time.

Protection of mooring equipment that is usually located on the forecastle deck.

Simpler and stronger construction of skin plates and stiffeners due to a large proportion of double-curved area.

A reduction in loads on skin plates and stiffeners due to elimination of flare.

Smooth foreship all the way up to the bridge deck, which results in reduced danger of icing. All deck equipment that is normally exposed to wind, weather and icing is protected.

Smooth foreship all the way up to bridge deck, which results in simpler installation of de-icing equipment.

BRIEF DESCRIPTION OF THE DRAWINGS

In the following, a non-limiting embodiment of the arrangement according to the invention is described in more detail with reference to the accompanying drawings, wherein.

DETAILED DESCRIPTION OF THE INVENTION

In the following description and in the claims, unless otherwise specified, all disclosures of direction are explained on the basis that the vessel is in a three-dimensional coordinate system where the vessel's length direction, breadth direction and height direction correspond respectively to the x-axis, y-axis and z-axis of the coordinate system, wherein the x-axis and the y-axis are oriented in the horizontal plane whilst the z-axis is oriented in the vertical plane. Furthermore, the forward direction of the ship corresponds to the positive x-direction.

Figure 1:
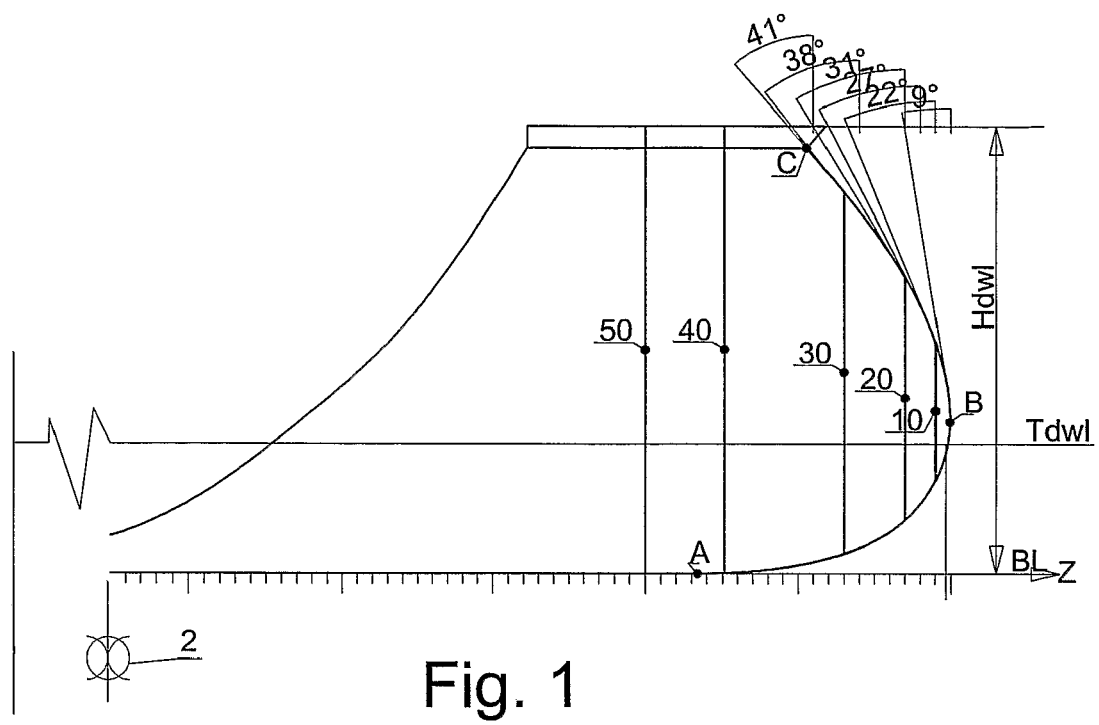
FIG. 1 is a side view of the profile of the foreship stem line.

The new foreship, shown from the midship mark 2 of the vessel, has a slender and distinctive bow shape. FIG. 1 shows the vessel's stem line 1, which starts at the base line 3 at point A and then rises with an increasing curvature whilst being drawn forwards in the length direction (x-direction) to a point B slightly above the design water line, Tdwl. From point B, the stem line 1 rises further, but now with a diminishing curvature and backwards (in the negative x-direction) until it reaches point C. At point C, the stem line is advantageously bent forwards and is terminated as the top of spray board 5.

Figure 2:
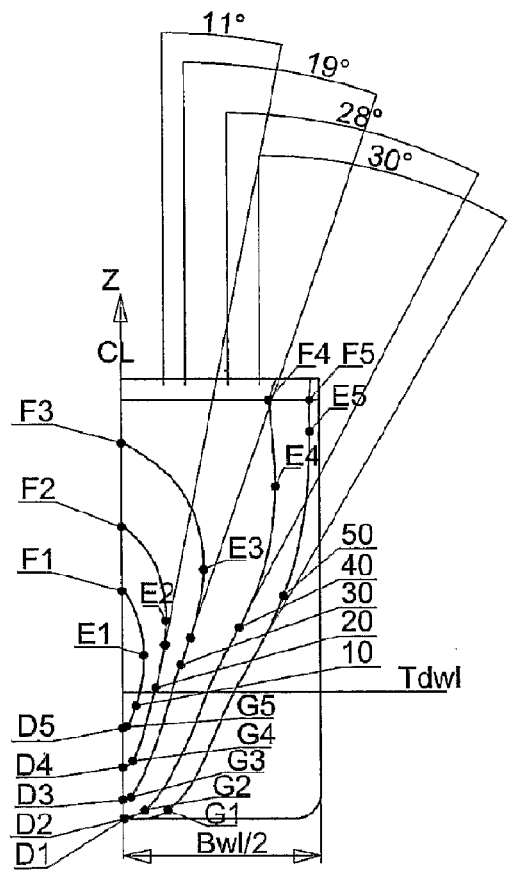
FIG. 2 is a front view of an extract of frame lines for the foreship.

The frame lines of the foreship are designed transversely symmetrical about the centre line (CL) of the vessel. FIG. 2 shows the frame lines 10, 20, 30, 40, 50 of the hull which start at points D1, D2, D3, D4 and D5 and run almost perpendicularly from CL and increase in breadth (the y-direction) from CL. The frame lines 10, 20, 30, 40, 50 then respectively merge into the bilge G1, G2, G3, G4, G5, at a given bilge radius. From the bilge and up to points E1, E2, E3, E4, E5, the frame lines 10, 20, 30, 40, 50, respectively, are outwardly sloping, and in the embodiment shown in this figure at angles a2=11 degrees, a3=19 degrees, a4=38 degrees and a5=30 degrees relative to the centre line CL. At points E1, E2, E3,E4, E5, the outwardly sloping frame line form is terminated and is run on upwards as a curved frame line form, either back to the centre line CL at points F1, F2, F3, or further upwards in a very gentle curve towards the centre line CL to points F4, and F5.

From the figure, it can also be seen that the bottom of the vessel is flat at the midship mark 2.

Figure 3:
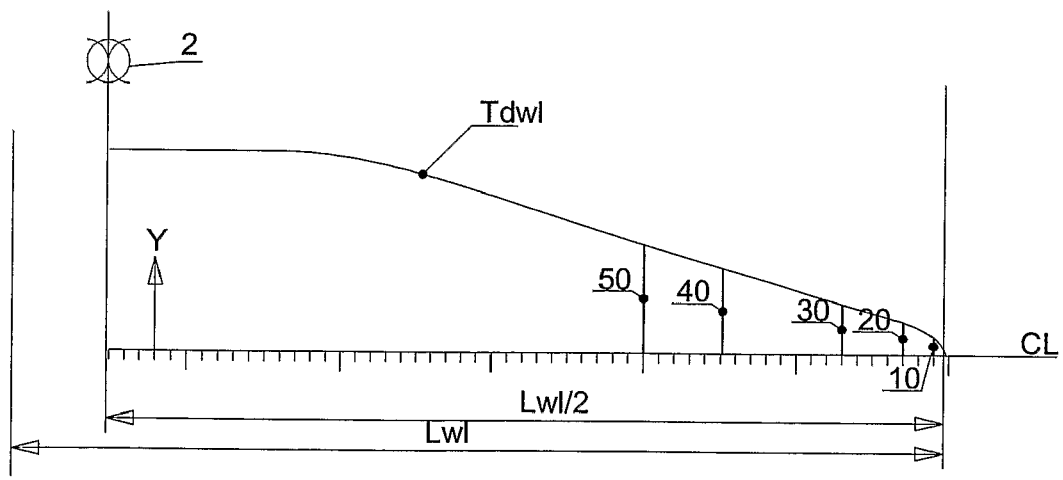
FIG. 3 shows the water line for the foreship.

FIG. 3 shows the water line/entry angle seen in the xy-plane (length/breadth direction), which for the embodiment illustrated in this figure is 20.3 degrees, and which advantageously is between about 16 and 25 degrees relative to the centre line CL at the design water line Tdwl for reduced or increased slenderness.

Figure 4:
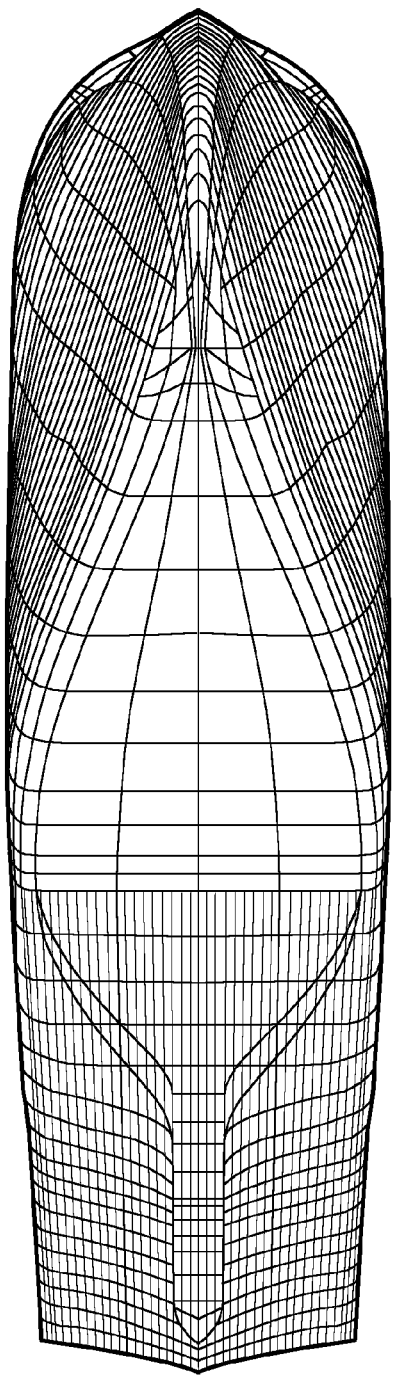
FIG. 4 is a perspective view of a hull, principally from below, with the foreship designed according to the invention.
Figure 5:
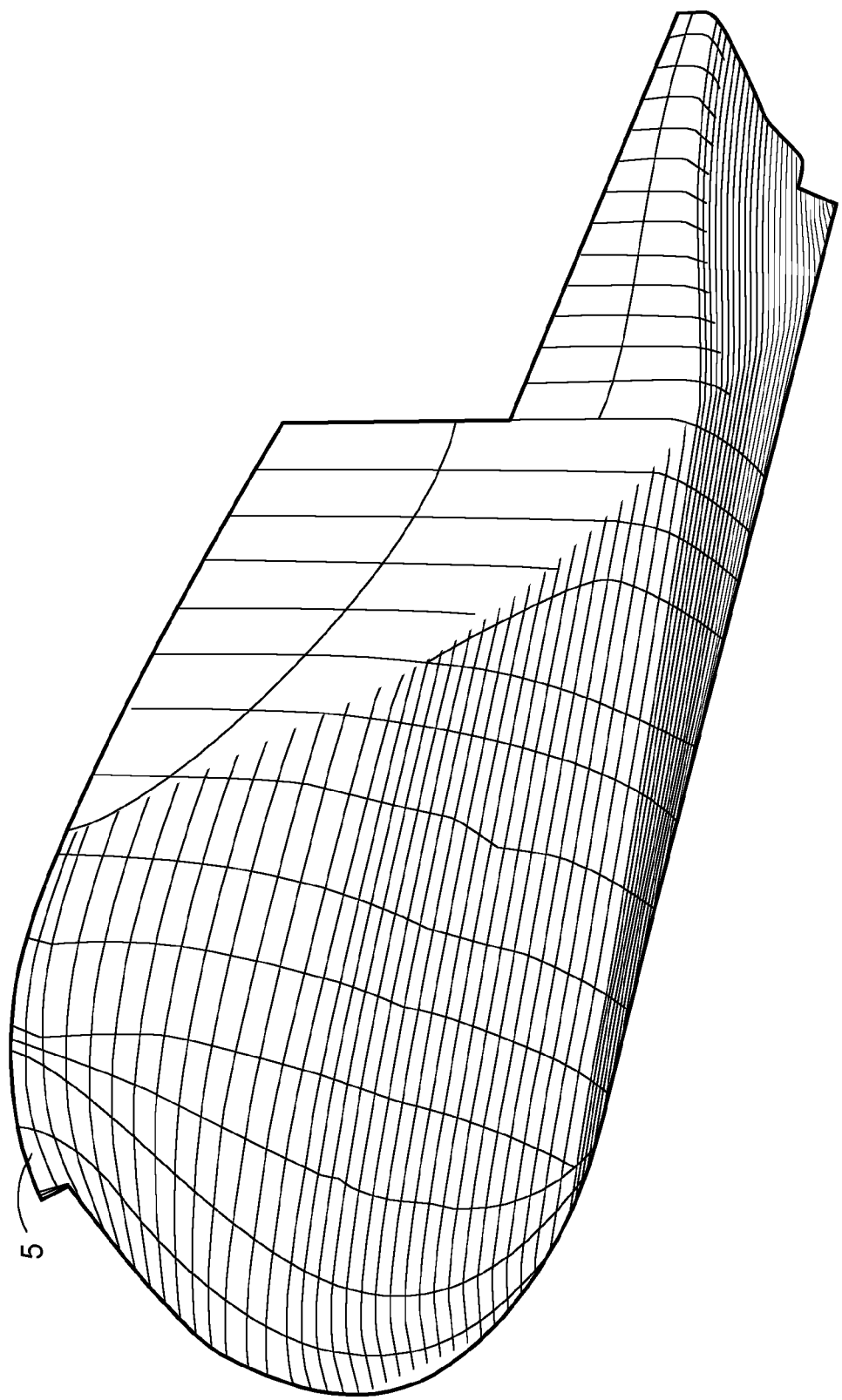
FIG. 5 is another perspective view of the basic shape of the hull in FIG. 4, principally from the side.
Figure 6:
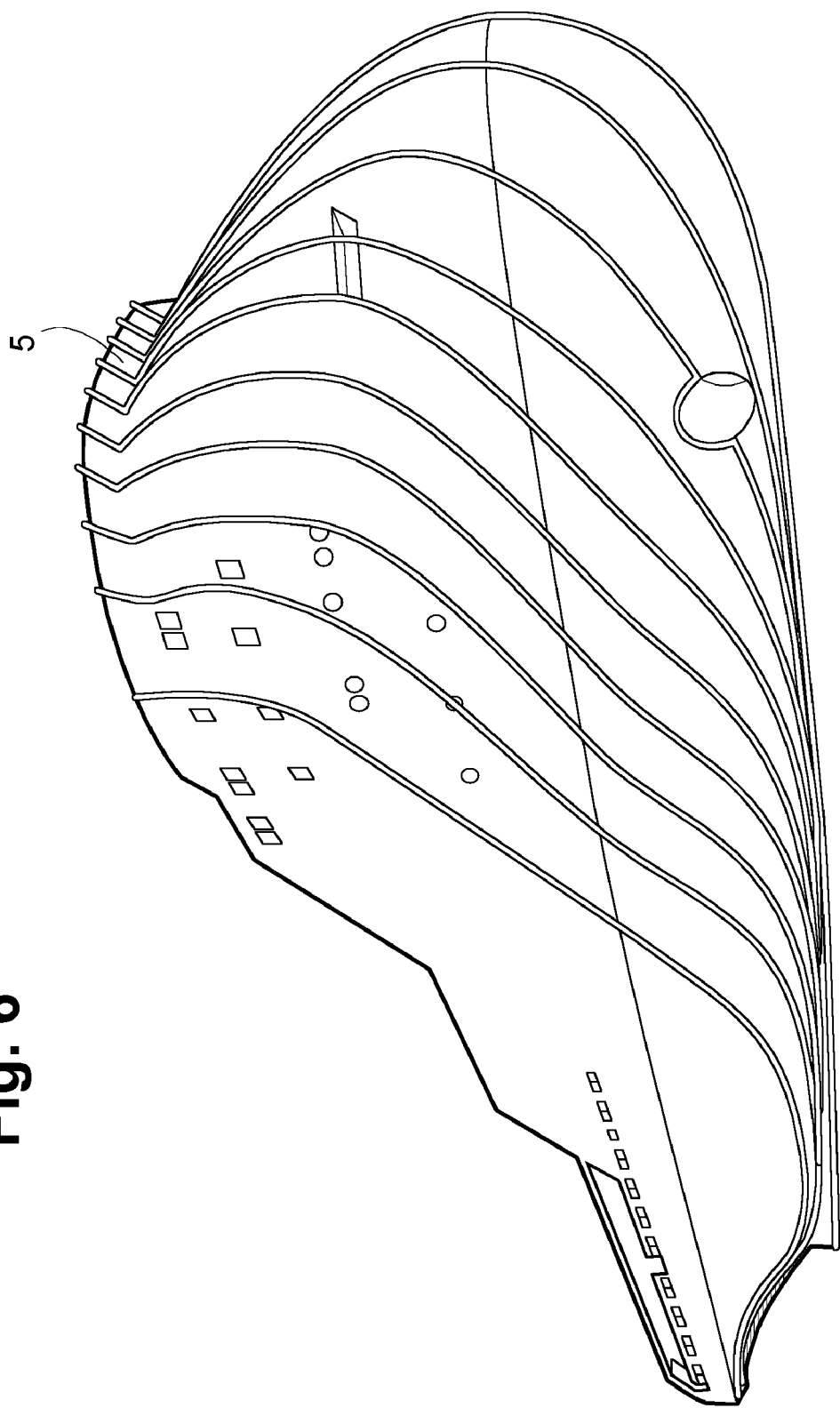
FIG. 6 is a further perspective view of the hull in FIG. 4, principally from the side.

FIGS. 4, 5 and 6 show the foreship according to the illustrated embodiment of the invention in different perspectives, advantageously provided with spray board 5.

The table below shows advantageous ratios between water lines, slenderness and hull height for different ranges of water line length, where the water line Lwl is given in meters and at a given draught Tdwl, and where the hull breadth Bwl is measured at the zero intersection and at a given draught Tdwl.

|  | Lwl | | | | | |
| --- | --- | --- | --- | --- | --- | --- |
|  | 60-90 | 90-120 | 120-150 | 150-180 | 180-210 | 210- |
| Bwl/Tdwl | 2 | 3 | 3.5 | 3.5 | 4 | 5 |
| Lwl/Bwl | 3 | 4.5 | 5 | 5.5 | 6 | 10 |
| Lwl/Tdwl | 5 | 13 | 17 | 20 | 22 | 23 |
| Htdwl/Bwl | 0.5 | 0.8 | 0.7 | 0.55 | 0.45 | 0.5 |
| Lwl/Htdwl | 2 | 5.5 | 7.5 | 10.5 | 13.5 | 15 |

The use of the above-mentioned ratios for the given water line length ranges Lwl results in more slender entry lines, increased water line length and only slightly outwardly sloping hull or frame lines (small flare).

The abbreviations, which are used in this application, and in particular in the above table, have the following definitions:

Tdwl: Draught (at the design water line)

Bwl: Breadth measured at a given draught Tdwl

Lwl: Water line length measured at a given draught Tdwl; in other words total length of the submerged volume.

Htdwl: Hull height measured from Tdwl up to the top of the spray board.

For the illustrated and described exemplary embodiment, it may be specified that Tdwl=6 meters, Lwl=81.1 meters, Bwl=18.5 meters and Htdwl=14.8 meters. The spray board 5 advantageously has a vertical height of 1 meter, so that the height measured from Tdwl to the transition to the spray board is thus 13.8 meters.

The vessel's flare angles in the foreship, and above the design water line (Tdwl) are in the range of 9-45 degrees relative to the height direction of the vessel.

The vessel's stem angles between the transition point (B) and the upper point (C) increase from 0 degrees at the transition point (B) to 55 degrees at the upper point (C) relative to the height direction of the vessel.

The invention claimed is:

1. A foreship configuration of a vessel of the displacement type, wherein the foreship is defined as part of the vessel in front of a midship mark of the vessel, wherein the vessel has a transversely symmetrical hull shape about a vertical plane through a vessel centre line CL, wherein a stem line of the vessel turns substantially aftwards from a transition point B just above a vessel design water line Tdwl and to an upper point C of the hull at the stem, so as to form a convex stem contour line from the vessel, the vessel transition point B, or from a bottom line BL of the vessel up to said upper point C when viewing the vessel in side view, wherein for any one of vessel draughts between a ballasted or fully loaded vessel, a default water line of the vessel at the stem will be at a location on said convex stem contour line for such draught in question;

wherein the foreship has frames with respective defined first, second, third, fourth and fifth frame lines 10, 20, 30, 40, 50, transversely and symmetrical about the centre line CL vertical plane, and mutually spaced in the longitudinal direction of the foreship, the first line being foremost, wherein said frame lines start from respective depth locations D5, D4, D3, D2, D1 at said plane, the first frame line 10 starting at location D5 which is higher than the other frame lines;

wherein location D4 is higher than location D3, and location D3 is higher than locations D2 and D1;

wherein the first frame line 10 has an upper location F1 at said plane and is bent outwards from said plane between the depth location D5 and the upper location F1 to a maximum lateral location E1, wherein the second frame line 20 has an upper location F2 at said plane and is bent outwards from the plane between the depth location D4 and the upper location F2 to a maximum lateral location E2 which is beyond the lateral location E1, wherein the third frame line 30 has an upper location F3 at said plane and is bent outwards from the plane between the depth location D3 and the upper location F3 to a maximum lateral location E3 which is beyond the lateral location E2, wherein the fourth frame line 40 has an upper location F4 at a stem spray board transition line passing through the upper point C of the stem and separating an upper region of the stem from a spray board located above the stem and said fourth frame line 40 is bent outwards from the plane between the depth location D2 and the upper location F4 to a maximum lateral location E4 which is beyond the lateral location E3, wherein the fifth frame line has an upper location F5 at the stem board transition line and is bent outwards from the plane between the depth location D1 and the upper location F5 to a maximum lateral location E5 which is beyond the lateral location E4, and wherein the upper location F4 of the fourth frame line 40 is closer to said centre line plane than the upper location F5 of the fifth frame line.

2. The foreship configuration of claim 1, wherein foreship breadth measured at a design water line Twdl of the vessel is defined as Bwl, wherein vessel water line Lwl is water line length at said Twdl, wherein foreship hull height measured from said Tdwl upwards to a top of a vessel spray board is defined as Htdwl, wherein for a specific water line length Lwl in excess of 60 meters, the following ratios are defined:
(i) Bwl/Tdwl being in range 2-5,
(ii) Lwl/Bwl being in range 3-10,
(iii) Lwl/Tdwl being in range 5-23,
(iv) Htdwl/Bwl being in range 0.45-0.8, and
(v) Lwl/Hwl being in range 2-15.

3. The foreship configuration of claim 1, wherein the upper point C of the stem is located between the third 30 and fourth 40 stem lines, when viewing the vessel in side view.

4. The foreship configuration of claim 1, wherein the convex stem contour line from vessel bottom line BL to said upper point C starts at the bottom at a location A at or close to the fourth frame line 40.

5. The foreship configuration of claim 1, wherein the convex stem contour line from the vessel transition point B to said upper point C starts at or close to the fourth frame line 40.

6. The foreship configuration of claim 1, wherein the vessel design water line Tdwl is at a level above the bottom of the vessel which is between the depth location D5 and the upper location F1 of the first frame line.

7. The foreship configuration of claim 6, wherein the design water line Tdwl is closer to the depth location D5 than the upper location F1.

8. The foreship configuration according to claim 1, wherein said spray board extends out from the upper point C to form a bow location spray board line, a transition between the upper portion of the stem line and the spray board line at said upper point C forming a mutual angle.

9. The foreship configuration according to claim 1, wherein an entry angle of the bow at the design water line Tdwl and in a plane coincident with a horizontal plane is in the range of 16-25 degrees relative to the centre line CL.

10. The foreship configuration according to claim 2, wherein for a water line length Lwl of 60-90 meters: Bwl/Tdwl=2, Lwl/Bwl=3, Lwl/Tdwl=5, Htdwl/Bwl=0.5 and Lwl/Htdwl=2.

11. The foreship configuration according to claim 2, wherein for a water line length Lwl of 90-120 meters: Bwl/Tdwl=3, Lwl/Bwl=4.5, Lwl/Tdwl=13, Htdwl/Bwl=0.8 and Lwl/Htdwl=5.5.

12. The foreship configuration according to claim 2, wherein for a water line length Lwl of 120-150 meters: Bwl/Tdwl=3.5, Lwl/Bwl=5, Lwl/Tdwl=17, Htdwl/Bwl=0.7 and Lwl/Htdwl=7.5.

13. The foreship configuration according to claim 2, wherein for a water line length Lwl of 150-180 meters: Bwl/Tdwl=3.5, Lwl/Bwl=5.5, Lwl/Tdwl=20, Htdwl/Bwl=0.55 and Lwl/Htdwl=10.5.

14. The foreship configuration according to claim 2, wherein for a water line length Lwl of 180-210 meters: Bwl/Tdwl=4, Lwl/Bwl=6, Lwl/Tdwl=22, Htdwl/Bwl=0.45 and Lwl/Htdwl=13.5.

15. The foreship configuration according to claim 2, wherein for a water line length Lwl of 210 meters and above: Bwl/Tdwl=5, Lwl/Bwl=10, Lwl/Tdwl=23, and Lwl/Htdwl=15.

16. A foreship configuration for a vessel of the displacement type, comprising foreship breadth Bwl measured at a vessel design water line or draught, Tdwl;

water line length Lwl measured at said draught Tdwl;

vessel hull height Htdwl measured from said draught Tdwl up to the top of a spray board of the vessel, wherein the foreship of the vessel consists of the part of the vessel in front of a midship mark of the vessel wherein the foreship has multiple transverse frames with related frame lines 10, 20, 30, 40, 50, the frame lines each defining a range of flare angles wherein the vessel has a transversely symmetrical hull shape relative to a vertical plane through a vessel longitudinal centre line CL, so that said frame lines are symmetrical relative to said plane, wherein the vessel has a bow form below design water line or draught Tdwl, wherein the vessel has a stem line which turns in a rearward direction of the vessel from a transition point B just above the design water line Tdwl to an upper point C of the stem, wherein the frame lines 10, 20, 30, 40, start from respective lower points D5, D2, D3, D4 and D1 on said plane, and extend substantially perpendicular from the centre line plane, wherein maximum respective lateral distance location points E1, E2, E3, E4, E5 from the centre line plane is increased successively from frame line 10 being closest to the stem to frameline 50 being the rearmost of said frame lines, wherein the frame lines 10, 20, 30, 40, 50 at a region close to said respective lower points D5, D2, D3, D4 and D1 respectively merge with bilge points G5, G2, G3, G4, G1 of the vessel at a given bilge radius below the design water line Tdwl, wherein the frame lines each extend up to second and upper points F1, F2, F3, F4, F5 said second and upper points of the three frame lines which are closest to the stem being terminated, respectively, on the centre line plane at second and upper points F1, F2, F3 at said plane, whereas the two rearmost frame lines 40, 50 are terminated at a level of the upper point C of the stem at respective second and upper points F4 and F5, point F5 being at a location which is further away from the centre line plane than point F4, said frame lines 40 at an upper region thereof having gentle curvature towards the centre line plane and wherein the foreship, at least above the design water line, has a convex shape without knuckle lines.

17. The configuration according to claim 16, wherein the stem line, starting from a lower point A at the vessel's base line rises and has a first range of curvature in the forward direction of the vessel up to the transition point B, and the stem line continues to rise from the transition point B with a second range of curvature in the aftward direction of the vessel to the upper point C, said second range having a radius of curvature which is larger than that of the first range.

18. The configuration according to claim 17, wherein the spray board extends out from the upper point C, the stem line being bent sharply forward at said upper point C and an extension of the stem line being terminated at the top of the spray board.

19. The configuration according to claim 16, wherein the flare angles above the design water line Tdwl are in the range of 9-45 degrees relative to said vertical plane.

20. The configuration according to claim 16, wherein the vessel exhibits stem angles between the transition point B and the upper point C which increase from 0 degrees at the transition point B to 55 degrees at the upper point C relative to said vertical plane.

21. The configuration according to claim 16, wherein an entry angle of the bow at the design water line Tdwl and in a plane coincident with a horizontal plane is in the range of 16-25 degrees relative to the centre line.

22. The configuration according to claim 18, wherein when a water line length Lwl is in the range of 60-90 meters: Bwl/Tdwl=2, Lwl/Bwl=3, Lwl/Tdwl=5, Htdwl/Bwl=0.5 and Lwl/Htdwl=2.

23. The configuration according to claim 18, wherein when a water line length Lwl is in the range of 90-120 meters: Bwl/Tdwl=3, Lwl/Bwl=4.5, Lwl/Tdwl=13, Htdwl/Bwl=0.8 and Lwl/Htdwl=5.5.

24. The configuration according to claim 18, wherein when a water line length Lwl is in the range of 120-150 meters: Bwl/Tdwl=3.5, Lwl/Bwl=5, Lwl/Tdwl=17, Htdwl/Bwl=0.7 and Lwl/Htdwl=7.5.

25. The configuration according to claim 18, wherein when a water line length Lwl is in the range of 150-180 meters: Bwl/Tdwl=3.5, Lwl/Bwl=5.5, Lwl/Tdwl=20, Htdwl/Bwl=0.55 and Lwl/Htdwl=10.5.

26. The configuration according to claim 18, wherein when a water line length Lwl is in the range of 180-210 meters: Bwl/Tdwl=4, Lwl/Bwl=6, Lwl/Tdwl=22, Htdwl/Bwl=0.45 and Lwl/Htdwl=13.5.

27. The configuration according to claim 18, wherein when a water line length Lwl is in the range of 210 meters and above: Bwl/Tdwl=5, Lwl/Bwl=10, Lwl/Tdwl=23, and Lwl/Htdwl=15.

* * * * *